Patented Feb. 24, 1931

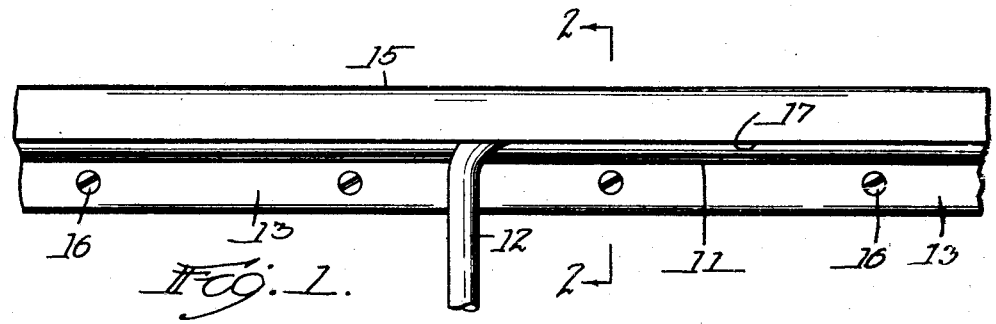
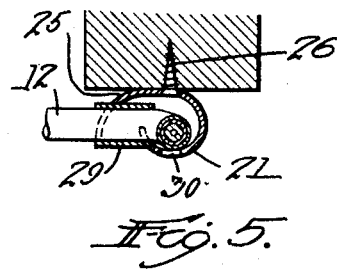
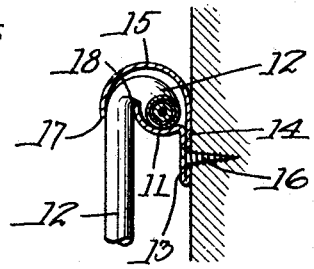
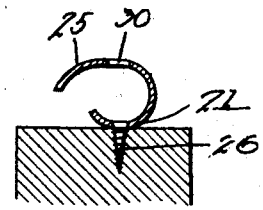
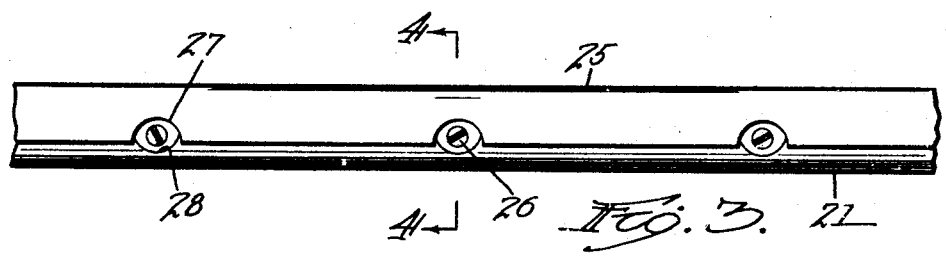
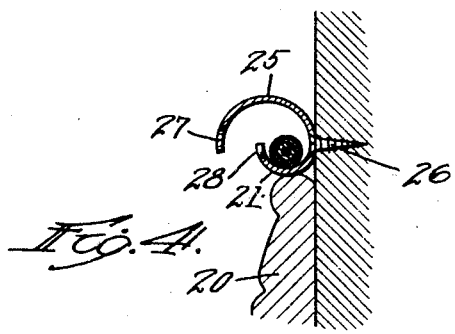

1,794,102

UNITED STATES PATENT OFFICE

ARTHUR C. COMINS, OF WORCESTER, MASSACHUSETTS

CONDUIT FOR ELECTRIC WIRES

Application filed October 27, 1927. Serial No. 229,223.

This invention relates to a conduit or duct for electric wires that are led around or across a room or building, for the purpose of holding them in place and concealing them.

The principal objects of the invention are to provide such a conduit in a form in which the wires or cable can be tucked into it from the side all along its length and will not have to be strung in from one end, as in the case of a tube; to provide a construction by which the wire can be pulled out at any point along the length of the conduit without cutting into the conduit or displacing its parts, thus permitting of the changing of wiring from one point to another, and into which the wire can be put back in a very convenient way; to provide a construction for supporting insulated wires concealed from view, protected from dirt and injury and yet easily pulled out, as stated above, for changing the position of a light or other connection.

Other objects and advantages of the invention will appear hereinafter.

Reference is to be had to the accompanying drawings in which

Fig. 1 is a front view of a conduit constructed according to this invention;

Fig. 2 is a transverse sectional view on the line 2—2 of Fig. 1;

Fig. 3 is a front elevation of a preferred form of the invention;

Fig. 4 is a sectional view on the line 4—4 of Fig. 3; and

Figs. 5 and 6 are sectional views showing other modifications.

The ordinary conduit for insulated wires or cables, suitable for use in homes, offices or factories, is a tube into which the wires have to be strung from one end to the other. This involves material expense in the installing of it and makes the system inflexible because, when once put up, the wires cannot be brought out at any new point without taking down the tube and cutting or splicing it. Otherwise the wires have to be strung in the open, exposed to dirt and injury, and unsightly. Ordinarily no conduit is used in a room. This invention is designed to overcome these difficulties and secure the advantages mentioned.

Referring first to Figs. 1 and 2, it will be seen that the device comprises a structure made of sheet metal or other thin material that can be formed into the shape indicated. In this case there is a longitudinal concave bottom 11 constituting a support for the electric wires or cables 12. This is bent downwardly at the rear to form a flange 13 and then upwardly back of that to form a side 14 and then outwardly to form a top 15. This structure extends in this shape throughout the length of the room or around the several sides, if that is desired. The flange 13 and the side 14 are perforated to provide a place for inserting holding screws 16 in this form.

It will be noticed that the top or cover 15, which is integral with the bottom or support 11, is spaced from this support all around and projects materially beyond or below it along the front edge 18 either in spring contact with said edge or leaving a horizontal slot between the two edges so as to permit the wires or cable 12 to be tucked in between the two edges 17 and 18 at any point all along the conduit. By the same slot an instrument like a hook or screw-driver can be inserted and the wires pulled out at any point.

In Figs. 3 and 4 I have shown another form in which the conduit is of simpler construction comprising a bottom 21 which might parallel the top of a mop board 20, or other molding, and a top 25 which are related to each other similarly to the bottom 11 and the top 15. Their connection with each other is continuous at the back and the screw 26 or nail for holding this conduit in position is extended through the single thickness at the back as indicated. At the edges are notches 28 and also preferably notches 27, the former being in the edge of the bottom 21 and the latter in the edge of the top 25. These serve two purposes, first, to form an opening as indicated in Fig. 3 through which the wires or cable can be pulled out at right angles to their length, whenever desired, for the purpose of locating a lamp or other connection in a new position. They also serve as a means for getting at the screws 26, which are in line with them, and thus are serviceable in putting up the conduit and taking it down. It will be seen that an end of the enclosed wire can be brought out of the conduit very easily for the attachment of a fitting at any point.

If used for instance along a mop board in a house, and even around door casings, it permits the temporary hanging-out of one or more wires or sockets for lamps or telephones etc. at any point about the room; and moreover these can be re-located at any other point merely by crowding or stretching the contained slack wire, or by replacing it with one of different length, the enclosed wire being connected at the other end with any permanent wall-socket or partition entrance. For this reason, in new construction, only an occasional wall entrance, and that placed only with regard to economy in building, is necessary, irrespective of the location present, or future, of its possible connections. A sleeve or collar 29 can be used to slide along the wire and be located at the notch to protect the insulation against chafing at that point.

The material of which it is made preferably is sheet metal which is capable of yielding a little on receiving the wire as shown in Fig. 2. If it is made with a passage between the points 17 and 18 so narrow as to have to yield to receive the cable, then the cable will be held in place with more security because there is no danger of any ordinary event happening that will force the cable out of the narrowed passage. This, however, is not really essential as the cable is held in a place by gravity anyway. Any new connection that is made is just as permanent and just as neat in every way as if made at the time of installation. This conduit furnishes a support for the wires or cable and may be made capable of holding several if necessary. They will rest on the bottom 11 or 21 by gravity and the yieldingly extending flange over this bottom holds them against any ordinary displacement by accident.

They are concealed from view and protected from dirt and injury. The duct can be made in imitation of a molding or placed on top of an ordinary molding. It can be attached in the ways shown or with cleats as may be desired.

Other forms in which the device can be made are shown in Figs. 5 and 6. These are very much like Fig. 4 but are specially adapted to be used on the bottom or top of a horizontal surface. They are shown with a hole 30, instead of a notch for the fastening nail or screw 26.

Although I have illustrated and described only two forms of the invention I am aware of the fact that other modifications can be made therein by any person skilled in the art without departing from the scope of the invention as expressed in the claims.

Therefore, I do not wish to be limited in these respects but what I do claim is:—

1. As an article of manufacture, a conduit for the purpose described having a concave bottom for supporting a wire or cable throughout its length, a top extending upwardly therefrom and over and beyond the edge of the bottom, the outer edges of the top and bottom being spaced from each other to form a longitudinal slot entirely open from below, through which the wires or cable can be introduced laterally into the interior of the conduit, and through which they can be pulled out at any point therealong and a fastening device extending radially from said conduit at a point intermediate between said top and bottom.

2. As an article of manufacture, a conduit for the purpose described comprising a bottom or support adapted to hold a cable or wires thereon, the front edge of the bottom having notches at intervals therealong, and a top extending upwardly from the rear thereof and then outwardly and downwardly and having an outer edge spaced from the outer edge of the bottom a distance approximately the same as the diameter of a cable to be inserted therein, this outer edge also having notches registering with the first named notches and constituting spaces with them through which the cable or wires can be withdrawn at these points.

3. As an article of manufacture, a conduit for electric wires and cables having a concave bottom for supporting the wire or cable, a concave rear wall and a top extending from said rear wall over the bottom at a distance above it and beyond the edge of the bottom, the three parts forming a continuous smooth curve, and fastening devices extending radially from said curve for supporting the conduit, the outer edges of the top and bottom being spaced from each other to form a longitudinal slot open from below and without obstruction, whereby the wire or cable can be introduced through it in a position to rest on the bottom.

In testimony whereof I have hereunto affixed my signature.

ARTHUR C. COMINS.